A plow system includes a number of individual plow units mounted on a beam which is inclined relative to the direction of travel of a traction vehicle. The units are mounted for continuous rotation about vertical axes so that they may be opened or closed to adjust the width of a cut between adjacent units over a continuous, wide range. The plow unit is supported by a forward furrow wheel located to ride in previously-plowed ground and a rear furrow wheel, and the main frame is pulled by a tongue or draft member connected between a tractor hitch and an intermediate location of the inclined beam. A hydraulic unit adjusts the individual plow units in unison, and at the same time, through a linkage, adjusts the tongue relative to the inclined beam to keep the forward furrow wheel at a constant distance from the rear tractor wheel for all width adjustments. A steering mechanism adjusts a steerable wheel, which may be the rear furrow wheel, to toe in such a manner as to offset the moment force on the system tending to rotate the system about the tractor hitch, and this offset or counter force caused by the toeing of the steerable wheel is adjusted to counteract the moment force which changes as the cutting width is varied. Further, the inclined beam is provided in modular form so that additional plow units may be added using standard parts or elements, as desired.

United States Patent [19]

Dietrich

[11] 4,049,063
[45] Sept. 20, 1977

[54] MULTI-UNIT ADJUSTABLE PLOW SYSTEM

[75] Inventor: William John Dietrich, Congerville, Ill.

[73] Assignee: DMI, Inc., Goodfield, Ill.

[21] Appl. No.: 617,892

[22] Filed: Sept. 29, 1975

[51] Int. Cl.² ............................................. A01B 69/00
[52] U.S. Cl. ...................................... 172/283; 172/284; 172/285; 172/287; 172/291; 172/320; 172/144
[58] Field of Search ............... 172/283, 287, 291, 314, 172/282, 320, 284, 325, 144, 285

[56] References Cited

U.S. PATENT DOCUMENTS

| | | | |
|---|---|---|---|
| 1,472,768 | 10/1923 | Dickinson | 172/291 |
| 3,066,746 | 12/1962 | Sweet | 172/314 X |
| 3,481,406 | 12/1969 | Watts | 172/291 X |
| 3,559,745 | 2/1971 | Thompson et al. | 172/324 X |
| 3,598,185 | 8/1971 | Richey | 172/283 X |
| 3,749,178 | 7/1973 | Watts | 172/212 X |
| 3,750,759 | 8/1973 | Geurts | 172/285 |
| 3,783,950 | 1/1974 | Geurts | 172/291 X |
| 3,817,333 | 6/1974 | Kinzenbaw | 172/285 X |
| 3,818,995 | 6/1974 | Mellen | 172/282 X |
| 3,965,989 | 6/1976 | Ward | 172/314 X |

Primary Examiner—George J. Marlo
Attorney, Agent, or Firm—Tilton, Fallon, Lungmus, Chestnut & Hill

[57] ABSTRACT

8 Claims, 10 Drawing Figures

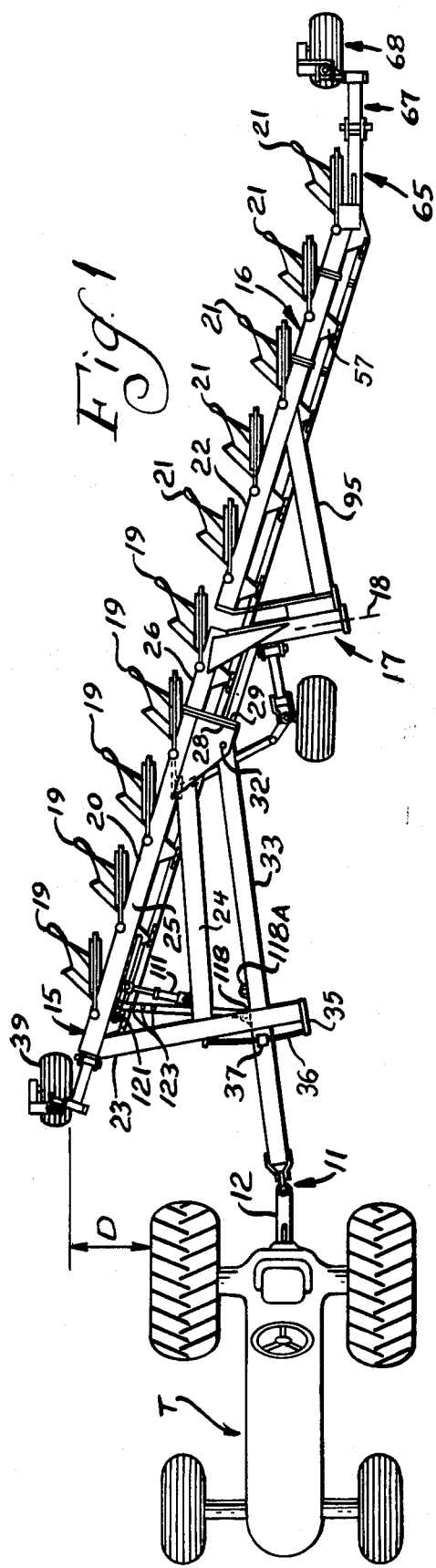
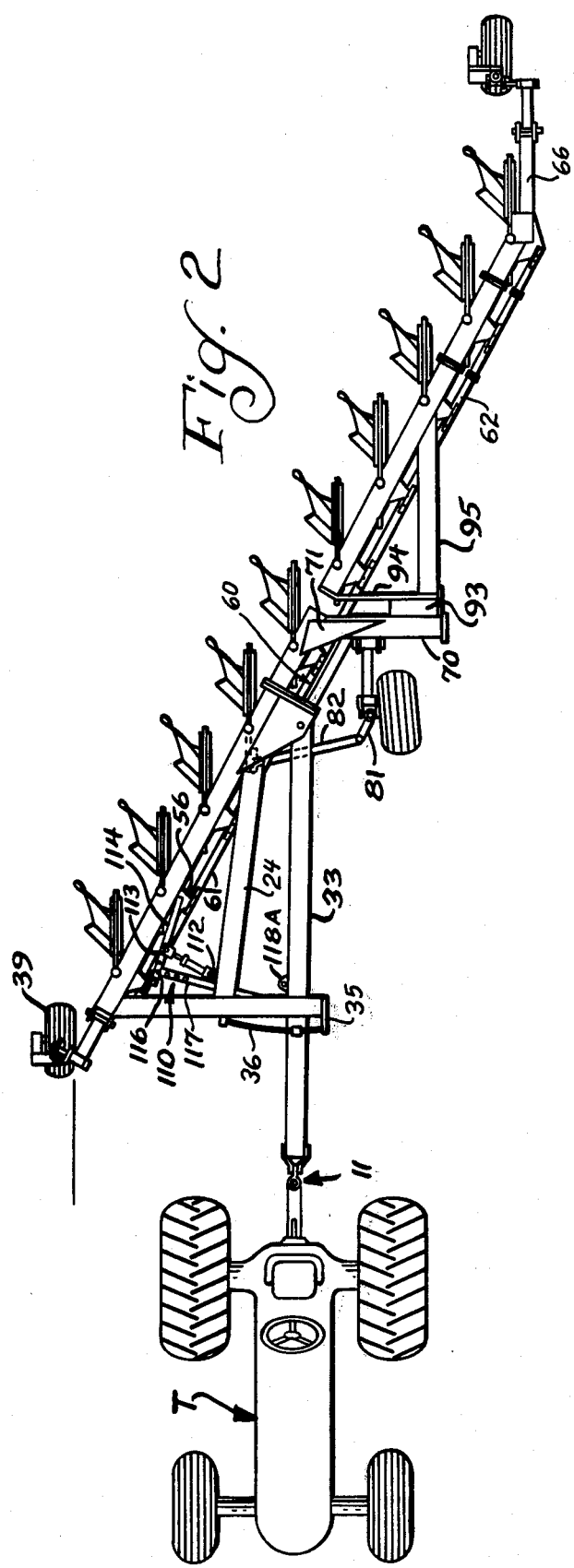

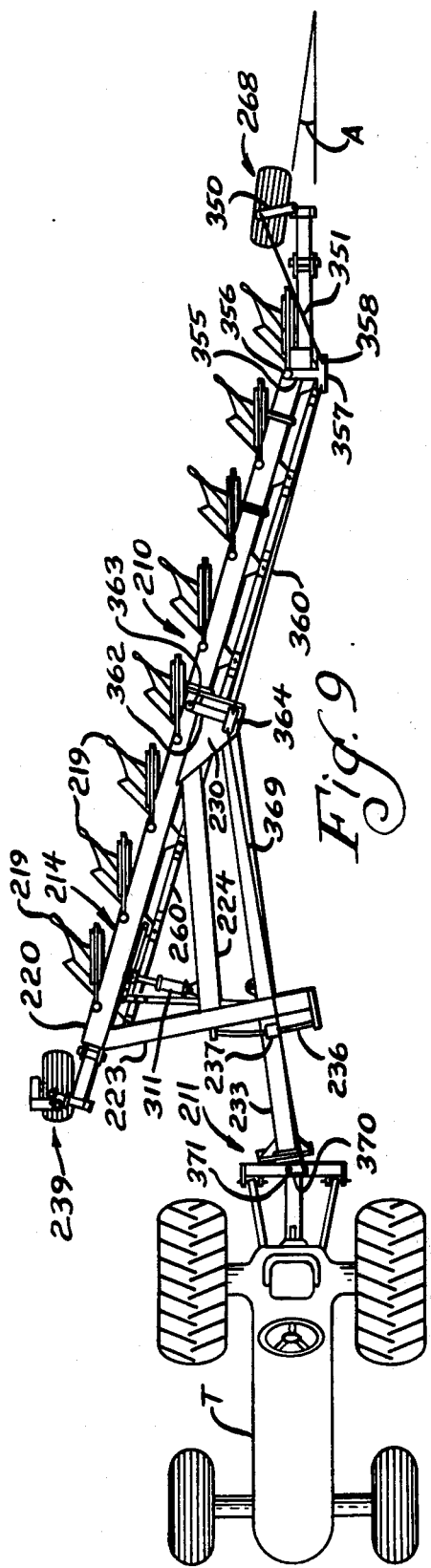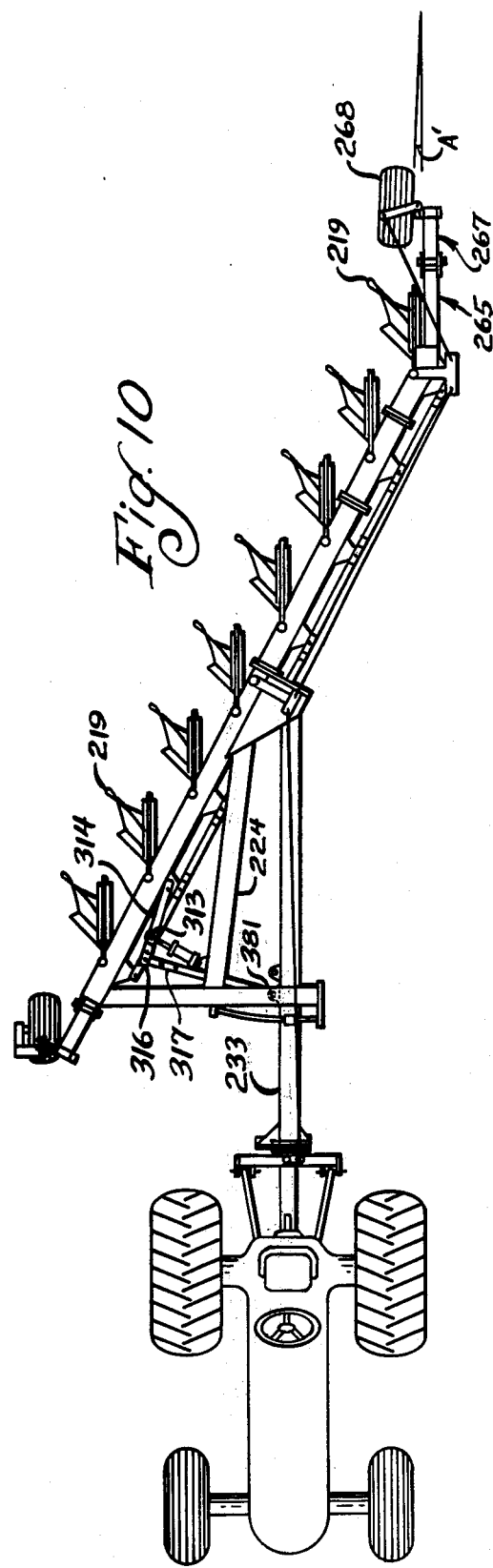

MULTI-UNIT ADJUSTABLE PLOW SYSTEM

BACKGROUND AND SUMMARY

The present invention relates to a plow system; and more particularly, it relates to improvements in a continuously adjustable plow system of the type disclosed in the Kinzenbaw U.S. Pat. No. 3,817,333, granted June 18, 1974. Another multi-bottom plow system is disclosed in the Thompson U.S. Pat. No. 3,559,745, but this latter is directed to a system in which the plow unit may be shifted either full-right or full-left, depending upon whether the operator wants to plow with a newly-plowed ground on his right or on his left.

In one aspect, the present invention provides a structure for the main frame which includes an inclined main beam on which the plow units are rotatably mounted, and wherein the forward section of the main beam is supported by a caster wheel located to ride in a previously-cut furrow. The inclined beam is pulled by a tongue or draft member, and the mechanism which adjusts the width of the plow units is interconnected by a linkage which adjusts the position of the tongue relative to the inclined main beam in such a manner that the rear wheel of the tractor may ride at a constant distance from a previously-cut furrow for all adjustments of the plow units.

In another aspect, the present invention provides a structure for toeing a steerable wheel supporting the plow system in such a manner to offset or counteract the moment force on the plow system, caused through reaction of the plow bottoms with the ground, and tending to rotate the plow system about the hitch.

In still another aspect of the present invention, the main beam is manufactured in standard modules, including a forward section, an intermediate section and a rear or tail section. By adding units to the intermediate section, the overall system may be designed to carry a wide range of plow units.

Other features and advantages of the present invention will be apparent to persons skilled in the art from the following detailed description of a preferred embodiment accompanied by the attached drawing, wherein identical reference numerals will refer to like parts in the various views.

THE DRAWING

FIGS. 1 and 2 are plan views of a first system incorporating the present invention with the plow units set respectively at a relatively narrow setting and a relatively wide setting;

FIGS. 9 and 10 are plan views of a second system incorporating the present invention with the plow units set respectively at a relatively narrow setting and a relatively wide setting.

DETAILED DESCRIPTION

Figure 3:
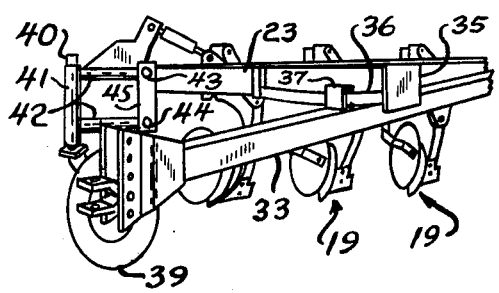
FIG. 3 is a fragmentary perspective view of the front of the plow system, taken from the left side of the tractor.

Referring to FIGS. 1 and 2, a conventional traction vehicle is indicated as T, and the plow system of the plow system of the present invention is generally designated by reference numeral 10. The plow system is pivotally connected at 11 to a draw bar 12 on the tractor T for rotation about a vertical axis.

The plow system of this embodiment has a main frame generally designated by reference numeral 14 which includes a forward frame section 15 and a rear frame section 16 which are connected together at a location designated 17 for relative pivotal movement about a horizontal axis 18.

A first plurality of plow units, sometimes called "plow bottoms," and designated 19 are pivotally mounted for rotation about their respective vertical axes to an inclined main beam 20 of the forward frame section 15. Similarly, a second plurality of plow units 21 are pivotally mounted to an inclined main beam 22 of the rear frame section 16.

Although the rear frame section is mounted to the forward frame section in such a manner as to articulate the entire frame about the axis 18, nevertheless, as will be more fully explained below, there is no relative pivotal motion about a vertical axis. Hence, the axis of the forward inclined beam 20 is maintained in the same vertical plane as the axis of the rear inclined beam 22. Since this plane is inclined at an acute angle relative to the direction of travel of the tractor, the beams are spoken of as being "inclined."

Turning now to the forward frame section 15, in addition to the inclined beam 20, it comprises a forward transverse beam 23 which is welded to the forward end of the inclined beam 20, and a third beam 24 which is welded at approximately the mid-section of the transverse beam 23 and extends generally rearwardly, and is secured to an intermediate point of the inclined beam 20.

The inclined forward beam 20 itself is divided into a forward section 25 and a rear section 26 which are butted together by means of endplates 28, 29 welded respectively to the rear end of the section 25 and to the forward end of the section 26.

Figure 4:
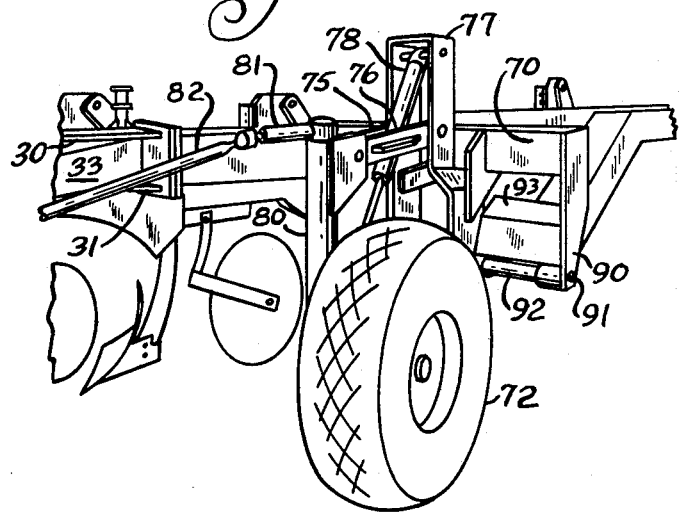
FIG. 4 is a left-side fragmentary perspective view of that portion of the system of FIG. 1 which includes the steerable intermediate wheel.

Turning now to FIG. 4, upper and lower braceplates 30, 31 are welded to the upper and lower surfaces respectively of the forward portion 25 of the forward inclined beam 20, and they are also welded to the forward surface of the endplate 28, and to the rear portion of the intermediate beam 24. This provides a housing for pivotally connecting at 32 the rear end of a tongue or draft member 33. The forward end of the draft member 33 is connected to the draw bar 12, and it passes beneath the transverse beam 23 of the forward frame section. The transverse beam 23 is provided with an endplate 35, and a curved track 36 extending between the endplate 35 and an intermediate location on the track 36. The curvature of the track 36 is such as to permit rotation of the forward frame section about the pivot location 32, and the track 36 passes through a guide 37 which may be provided with a roller or other friction-reducing means to facilitate relative motion between the track 36 and the tongue 33.

The forward end of the forward frame section is supported by a caster wheel 39 which, as can best be seen in FIG. 3, includes a vertical shaft 40 journaled in a sleeve 41. Extending rearwardly from the sleeve 41 are upper and lower links 42 which are pivotally connected at their forward ends 42A and 42B to the sleeve 41 and pivotally connected to their rear ends at 43 and 44 to affix link 45 (see FIG. 5). The link 45 is connected to the forward portion of the forward frame section. The hydraulic cylinder and piston rod unit 46 (not seen in FIGS. 1 and 2) has its rod end 47 pivotally connected to the forward portion 25 of the inclined main beam 20, and has its cylinder end pivotally mounted at 48 to a plate 49 attached to the upper one of the link 42. Thus, when the cylinder unit 46 is expanded, the links 42 and fixed link 45 act as a parallelogram linkage arrangement to raise the forward end of the plow system.

The plow units 19 and 21 may be the same as those disclosed in my above-identified patent, including a coulter 50 and a plow shear 51, together with a C-shaped yoke 53 (see FIG. 5) which straddles the inclined beam and is rotatably mounted to a vertical shaft 54 fixed to the beam.

Figure 5:
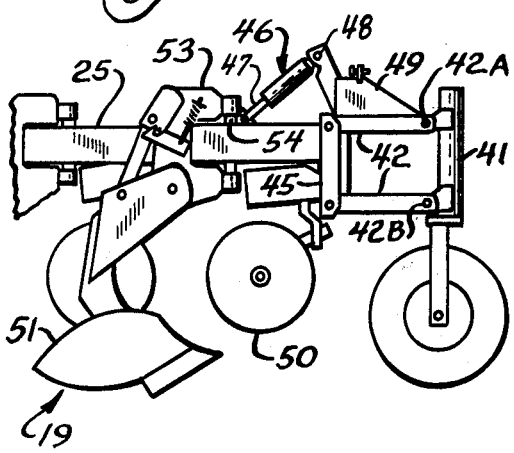
FIG. 5 is a fragmentary right side view of the front portion of the system of FIG. 1.

Turning now to FIG. 5, each of the forward plow units 19 and rear plow units 21 includes a fixed horizontal plate, designated 56 for the forward units and (FIG. 1) for the rear units, to which there is pivotally connected an elongated tie rod or guide bar 60. As indicated in the above-identified patent, the tie rod 60 is parallel to the axis to the main inclined beam (in this case both forward and rear sections) so that all plow units may be rotated in unison. In this case, the tie rod 60 (FIG. 2) includes a forward section 61 and a rear section 62 which are connected together to permit the rod to bend in a vertical plane which includes the axis 18, while continuing to rotate all of the individual plow units in unison about their respective vertical axes.

The rearmost plow unit, still referring to FIGS. 1 and 2 is integrally connected to a tail section generally designated by reference numeral 65 which includes a beam 66, a parallelogram linkage 67, and a rear caster wheel 68. The parallelogram linkage 67 is similar to that discussed in connection with the forward caster wheel, and the overall tail section is similar to that disclosed in the above-identified patent. The hydraulic piston and cylinder rod unit, not shown in FIGS. 1 and 2, may be used to raise the rear section of the plow system.

Figure 6:
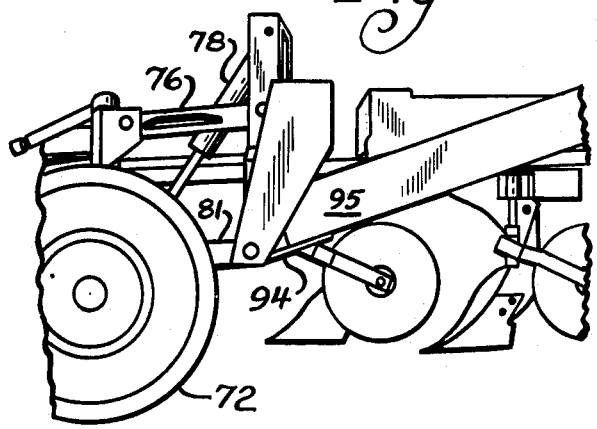
FIG. 6 is a left-side elevational fragmentary view of the juncture between the forward frame section and the rear frame section of the system of FIG. 1.

Referring now to FIGS. 2, 4 and 6, a beam 70 is welded to the rear end of the forward inclined beam 15, to extend laterally thereof, and the connection is strengthened by a braceplate 71. A steering support wheel 72 is mounted in front of the beam 70 as shown at 75, 76 in FIG. 4. A housing 77 extending above the beam 70 and attached to it holds a hydraulic cylinder and piston rod unit 78 for raising and lowering the beam 70 relative to the ground.

The tire 72 is provided with a vertical axle which is pivotally journaled in a sleeve 80, the upper end of the axle being provided with a steering arm 81. A link 82 is pivotally connected between the steering arm 81 and the forward end of one of the plow units—in the illustrated embodiment, the connection being at the forward end of the fourth plow unit on the forward frame section. It will thus be observed that as the tie rod 60 is translated toward the rear, all of the plow units will be rotated counterclockwise (as seen in FIG. 2), and that the link 82 will cause the steering arm 81 to rotate the wheel 72 in such a manner that after the plow has swung around to assume the opened position, the tire 72 will still be in a steering position.

Thus, the steering wheel 72 rides on unplowed land, supports the center portion of the plow unit, and is provided with a steering mechanism responsive to the positioning of the plow units for properly steering that center portion.

The steering wheel 72 has still another function and this is to compensate for the net moment force on the plow system caused by the drag force of the units during operation for the various settings. For example, in the closed position of FIG. 1, there will be a net rearward drag force or thrust on the system between the fifth and sixth plow units, and this force is to the right of the hitch 11 (when viewed from the rear). Thus, there is a resulting moment about the hitch point 11 which tends to force the entire unit toward the left when viewed from the rear (downward in FIG. 1). This force is overcome by toeing the wheel 72 in such a manner as to offset the moment force, and thereby compensate for it. When the net thrust is to the right of the hitch, the steering wheel toes into the plowed ground (the plowed ground being upward and rearward of the inclined beam in FIG. 1). Comparing this with the showing in FIG. 2, wherein the plow units are opened, the net thrust again is applied between the fifth and sixth unit. In this case, however, the thrust is to the left of the hitch, thereby causing a counterclockwise moment about that hitch point. Hence, in the opened position, the steering wheel 72 is not only adjusted for proper steering, but in addition, it is toed outwardly to offset the moment force which has shifted leftward from where it is when the units are closed, as in FIG. 1.

The lower end of the piston and cylinder rod unit 78 is connected to the forward end of a lower link 81, the rear end of which is pivotally connected to the lower portion of the housing 77. Thus, the center of the system is also capable of being selectively raised or lowered by means of a parallelogram linkage and a cylinder and piston rod unit.

At the outboard end of the beam 70 is a downwardly extending plate 90, and an axle 91 is mounted between the lower portion of the plate 90 and the lower extension of the housing 77. Journaled about the center portion of the axle 91 is a sleeve 92 and an upper extension 93 and lower plate 94 (see FIG. 6) to which is mounted an upwardly inclined, rearwardly extending beam 95. As best seen in FIG. 2, a forward brace bar 94 extends between the extension 93 and the forward portion of the rear inclined beam 22 to strengthen the structure. The rear end of the draw beam 95 is welded to an intermediate location of the rear inclined beam 22. Thus, the rear frame section is drawn by the lateral beam 70, axle 91, sleeve 92, and its connection to the draw beam 95.

Figure 7:
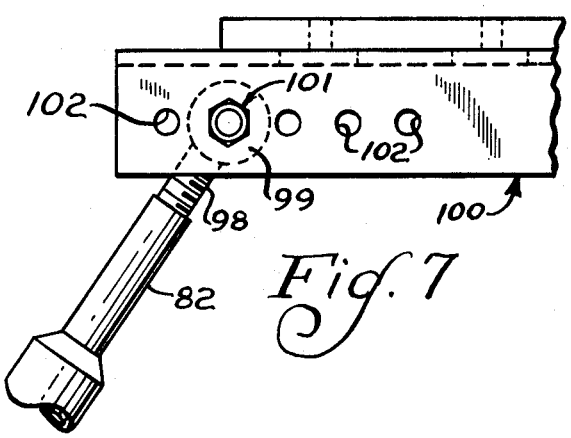
FIGS. 7 and 8 are respectively top and left-side fragmentary views illustrating the connection of the steering link to the forward frame section.
Figure 8:
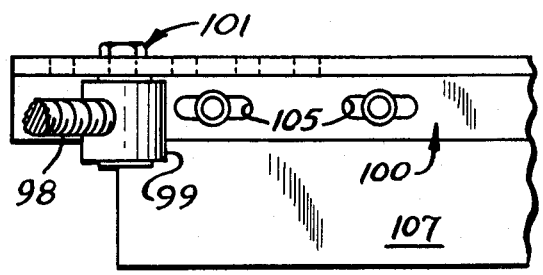

Referring now to FIGS. 7 and 8, the connecting link 82 is internally threaded and receives a mating stud 98, the distal end of which is ringed as at 99 for connection to an angle iron generally designated 100 by means of a nut and bolt fastener 101. The angle iron 100 is provided with a series of apertures 102 which are located in a horizontal portion of it for adjustably connecting the rod 82 to provide different types of compensation of the type just mentioned--namely, for crowding or toeing of the steering wheel 72, depending upon soil conditions. Still further adjustment is provided by the vertical arm of the angle iron 100 (see FIG. 8) which is provided with horizontally elongated slots 105 for bolting the angle iron to an extension 107 of the plow unit to which it is attached. Thus, the slots 105 provide a "fine" tuning of the steering adjustment, and the bolts 102 provide a larger adjustment.

Turning now to the left portion of FIGS. 1 and 2, there is shown the mechanism for adjusting the width of the plows generally designated by reference numeral 110 and including a hydraulic cylinder and piston rod unit 111 pivotally connected at 112 to the intermediate beam 24 of the forward frame section, and pivotally connected at 113 to a crank arm 114. The rear end of the arm 114 is rigidly attached to the plate 56 of the second plow unit from the forward end, and its own forward end is pivotaly connected at 116 to a second link 117, the other end of which is pivotally connected at 118 to the tongue 33. The arm 114 is provided with a series of apertures 121 for adjusting the connection of the link 117 thereto, and similarly, the link 117 may be provided with a number of adjusting apertures, designated 123 in FIG. 1. Still further adjustment is provided by permitting the link 117 to be connected to the boss 118A. Other such bosses may also be added if desired. Such adjustment is desirable for varying soil conditions and adjustments in plowing depth, both of which modify the reaction force on the plow units.

In this embodiment, the forward caster wheel rides in a furrow of previously-plowed land, and the rear caster wheel 68 rides in a furrow of land which has just been plowed by the system. The steering wheel 72 rides ahead of the inclined beam on unplowed ground.

Referring to the showing of FIG. 1, the plow units are adjusted for a cut of 12 inches between units, and the foremost unit is placed so that it cuts a 12-inch slot relative to the previously-plowed ground. When it is desired to open the units—that is, increase the spacing, the hydraulic cylinder unit 111 (which is a double-acting unit) is contracted. This rotates the plow units in a counterclockwise direction, and it also rotates the steering wheel, but in a counterclockwise direction. The inclined main beam will thence pivot about the caster wheel 39 and the hitch 11 to the adjusted position. A wider cut, namely a 22-inch cut between units, is shown in FIG. 2.

When the cylinder unit 111 is contracted, the arm 114 is drawn away from the inclined main beam, and because of the link 117, the inclined main beam is caused to rotate about the pivot connection 32 relative to the tongue 33. In other words, during opening of the units, when the inclined main beam swings to the left as viewed from the rear, the forward cross beam 23 slides over the tongue 33, and the tongue 33 pivots about the hitch point in a clockwise direction from the position of FIG. 1 to that of FIG. 2. This arrangement permits the driver of the tractor to maintain a fixed distance, indicated by the arrow D in FIG. 1, between his rear wheel and a previously-cut furrow for all adjustments of the plow units. The tractor T in the drawing is shown with only two main rear wheels, but persons skilled in the art will readily appreciate that a pair of dual wheels may be added for increased traction. Nevertheless, the spacing from a previously-cut furrow to the tractor wheels remains constant for the various adjustments of the plow units, and whereas the net rearward thrust on the main inclined beam and the system itself may shift relative to the location of the hitch point, this thrust is compensated for on a continuous basis by toeing the steering of the wheel 72 to offset it.

Referring now to FIGS. 9 and 10, there is shown another embodiment of the present invention wherein the number of plow units is smaller, and it is therefore not necessary to articulate the main frame. Further, as will be clear presently, the rear wheel is steerable in all adjusted positions, and it is also steered as the tractor turns to bring the tail section of the plow around with the tractor for greater maneuverability, as disclosed in the above-identified Kinzenbaw patent.

In the embodiment of FIGS. 9 and 10, a tractor is again designated as T, and the plow system is generally designated 210. The plow system is connected to the tractor by a conventional three-point hitch, generally designated 211.

The plow includes a main frame 214 comprising an inclined main beam 220, a transverse forward beam 223 and an intermediate beam 224 all rigidly connected together similar to the embodiment of FIG. 1.

A plurality of plow units, similar to those described above and designated 219 are pivotally mounted on the main inclined beam 220. The system is supported by a forward caster wheel 239 which rides in a previously cut furrow, and a steerable rear wheel 268, which rides in the furrow cut by the rearmost plow unit.

A tongue or draft member 233 is pivotally connected at its forward end to the hitch 211, and it is pivotally connected at its rear end to the frame 214 between an upper plate 230 and a lower plate, not shown, in a manner similar to that discussed in connection with FIG. 4 in the earlier embodiment.

As also shown in the earlier embodiment, a hydraulic cylinder and piston rod unit 311 is pivotally connected between the intermediate beam 224 and a crank arm 314 at 313. The crank arm 314 is fixed at its end to the second plow unit 219, and it is pivotally connected at its forward end 316 to a link 317, the other end of which is pivotally connected at 381 to the tongue 233.

The rearmost plow unit 219 is integrally formed with a tail section generally designated 265 which is a pivotally inclined beam 220 as well. The steering wheel 268 is connected to the tail section by means of a parallel linkage 267 for raising and lowering the rear end of the main frame.

The forward end of the transverse beam 233 is similarly provided with a track 236 which rides in a guide 237 fixed to the upper surface of the tongue 233. The track rides within the guide as the plow units are adjusted.

Turning now to the steering mechanism, the rear wheel 268 is provided with a steering arm 350 which is connected to a vertical axis on which the steering wheel 268 is mounted. A first link 351 connects the steering arm 350 to a first T-bar linkage 355. The T-bar linkage 355 is pivotally connected at 356 to the shaft on which the rearmost plow unit is mounted, and it includes a cross bar 357, the rear portion of which is designated 358 and connected to the forward portion of the link 351. The forward portion of the cross bar 357 is pivotally connected to a second link 360, the forward portion of which is pivotally connected to a second T-shaped link 362. The link 362 has its base pivotally connected to the inclined main beam 220 as at 363, and it includes a cross bar 364.

The rear portion of the cross bar 364 is pivotally connected to the forward end of the link 360, and the forward portion of the cross bar 364 is pivotally connected to a third link 369 at a location above the rear pivot mounting of the tongue 233 to the rigid frame 214. The forward portion of the link 369 is connected to an arm or crank member 370, the other end of which is rigidly mounted to a vertical shaft 371 which turns as the tractor turns.

In operation, when the hydraulic cylinder 311, which is a double-acting unit, is expanded, the second plow unit is rotated in a clockwise direction, thereby causing all of the units to rotate clockwise in unison, and closing the distance between adjacent units. When this happens, because of the length of the links 351, 360 and 369, and the location of the T-shaped links 355 and 362, the rear wheel 268 will be turned counterclockwise to thereby steer the tail section 265 to the adjusted position.

Further, once the adjusted position has been assumed, the tail wheel 268 is inclined at a toeing angle designated A in FIG. 9 which angle is measured relative to the true direction of travel of the system. The direction of the angle, and its magnitude are again designed to compensate for the moment force on the system which is produced when the plow units are all shifted toward the furrow (that is, "closed") while the distance of the rear tractor wheel from the furrow remains constant. It will be observed that the net force will be between the fourth and fifth plow units and this force is to the right of the tractor hitch connection and therefore produces a tendency to rotate the unit toward the left as viewed from the rear, or clockwise as seen in FIG. 9.

Comparing the showing of FIG. 9 (with the plows "closed") to that of FIG. 10 (where the plows are "opened"), it will be observed that the location of the mid-point between the fourth and fifth plow units has shifted to the left, when viewed from the rear, and in this position, it can be seen that the toeing angle A is still in proper direction to offset this moment (that is, steering the unit toward the previously plowed ground), but its magnitude has reduced. For the illustration of FIGS. 9 and 10, the toeing angle A may be approximately 8°, whereas the toeing angle A' may be approximately 2°.

When opening the plow units from the position of FIG. 9, the cylinder and piston rod unit 311 is contracted to rotate the units in a counterclockwise direction. As the system moves forward, the rear tail wheel is rotated counterclockwise to steer the tail section to its adjusted position. Because the pivotal connection of the link 362 and link 369 is on the axis of rotation of the plow frame relative to the tongue 233, as the entire system turns clockwise about the hitch 211, the T-shaped link 355 is caused to rotate clockwise slightly, thereby steering the tail wheel 268 in a counterclockwise direction, and assisting the unit to assume its adjusted position. In all positions, there is a steering connection between the tractor and the tail wheel 268 which causes the unit to trail around behind the tractor. For example, if the tractor turns left (as viewed from the rear), the arm 370 is rotated counterclockwise, thereby urging the link 369 rearward. This motion rotates the T-shaped links 362 and 355 in a counterclockwise direction, but the steering arm 360 is rotated clockwise, causing the tail wheel 268 to move behind the tractor—that is, against the direction of turning of the tractor. This steering is operative for all adjusted positions of the plow units.

It will also be observed that the spacing between the pivotal mounting of the forward furrow wheel 239 and the foremost plow unit 219 is such that the width of the first cut (that is, between the foremost plow unit and a previously cut furrow) is the same as the adjusted position for furrows cut between subsequent adjacent plow units. In other words, for example, if the adjustment between adjacent plow units is such as to cut a 20-inch swath, then the first cut (between the foremost plow unit and a previous furrow) is also 20 inches. In order to achieve this, it has been found necessary to foreshorten the distance between the pivotal connection of the forward furrow wheel 239 and the first plow unit 219 in relation to the spacing of the subsequent units. The exact amount of foreshortening depends upon the design, of course.

Having thus described in detail preferred embodiments of the invention, persons skilled in the art will be able to modify certain of the structure which has been illustrated and to substitute equivalent elements for those disclosed while continuing to practice the principle of the invention; and it is therefore intended that all such modifications and substitutions be covered as they are embraced within the spirit and scope of the appended claims.

I claim:

1. In a plow system adapted to be pulled by a traction vehicle having a rear wheel, said plow system having a frame with an inclined beam, a plurality of plow units mounted on said inclined beam and connected together for rotation in unison to adjust the cutting width of the plows, and power adjustment means for adjusting the width of said plow units, the improvement comprising:
   a front furrow wheel mounted adjacent the forward end of said inclined beam and adapted to ride in a previously formed furrow;
   a tongue pivotally connected at its forward end to a hitch on said vehicle and pivotaly connected at its rear end to said frame;
   means for slidably supporting a portion of said frame on said tongue; and
   link means pivotally interconnecting said tongue and said adjustment means for rotating said frame relative to said tongue responsive to the adjustment of said plow units such that the distance between said forward furrow wheel and said rear wheel of said vehicle remains constant over a continuous range of width adjustments for said plow units.

2. The system of claim 1 wherein said frame includes a transverse beam extending generally tranverse of the direction of travel of said vehicle and having an inboard end rigidly mounted to the forward end of said inclined beam, said tranverse beam further having an outboard end slidably carried by said tongue.

3. The system of claim 2 wherein said frame further comprises an intermediate beam extending generally parallel to the direction of travel of said vehicle and rigidly secured between said transverse beam and said inclined beam for bracing the same.

4. The system of claim 3 wherein said adjusting means comprises a crank arm fixedly connected to one of said units; a cylinder a piston rod unit pivotally connected at one end to said intermediate beam and at the other end to said crank arm; said link means comprising a link connected between said crank arm and said tongue; whereby as said hydraulic cylinder and piston rod unit is expanded to rotate said plow units, said frame is caused to rotate relative to said tongue in a clockwise direction when viewed from the top.

5. The apparatus of claim 4 wherein said crank arm defines a plurality of locations for connecting to said link, to permit adjustment of said system for varying conditions of soil and plowing depth.

6. The system of claim 5 wherein said link further defines a plurality of locations for connecting to said crank arm to permit further adjustment of said system for varying conditions of soil and plowing depth.

7. The system of claim 6 wherein said tongue defines a plurality of locations spaced along its length for connecting to said link to permit adjustment of said system for varying conditions of soil and plowing depth.

8. In a plow system adapted to be pulled through connection to a traction vehicle by means of a hitch permitting rotation of said plow system about a vertical hitch axis, said plow system including a frame having an inclined beam, a plurality of plow units mounted on said inclined beam and connected together for rotation in unison to adjust the cutting width of the plow units, the combination comprising power means for adjusting the width of said plow units and wherein the net rearward force on said frame shifts laterally relative to said hitch axis as the cutting width of said plow units is adjusted, said force shifting from a first position on one side of a line parallel to the direction of forward travel of said vehicle and passing through said hitch axis when said plow units are adjusted to relatively closed position to the other side of said line when said plow units are adjusted to a relatively open position; steering wheel means mounted at an intermediate location on said frame to at least partially support said frame, and steering means responsive to adjustment of said plow units for directing said steering wheel in the direction of travel of said vehicle and inclined from the true direction of travel of said vehicle such that when said plow units are in said relatively closed position, said steering wheel means is directed toward said one side of said line, and when said plow units are in said relatively open position, said steering wheel means is directed toward said other side of said line thereby to counteract the moment force on said frame about said hitch axis over a continuous range of adjustment of said plow units.

* * * * *